United States Patent [19]
Imamura et al.

[11] Patent Number: 6,128,600
[45] Date of Patent: Oct. 3, 2000

[54] ELECTRONIC SHOPPING SYSTEM AND METHOD OF DEFINING ELECTRONIC CATALOGUE DATA THEREFOR

[75] Inventors: Etsuko Imamura, Yokohama; Hiroshi Koike, Sagamihara; Yuri Honda, Tachikawa; Yuji Mizote, Yokohama, all of Japan

[73] Assignee: Hitachi, Ltd., Tokyo, Japan

[21] Appl. No.: 09/027,467

[22] Filed: Feb. 23, 1998

[30] Foreign Application Priority Data

Feb. 28, 1997 [JP] Japan .................................. 9-045272

[51] Int. Cl.⁷ .................................................. G06F 17/60
[52] U.S. Cl. .............................................................. 705/27
[58] Field of Search .................. 705/26, 27, 39, 705/29; 707/530, 531, 513

[56] References Cited

U.S. PATENT DOCUMENTS

| | | | |
|---|---|---|---|
| 4,972,318 | 11/1990 | Brown et al. . | |
| 4,992,940 | 2/1991 | Dworkin | 705/26 |
| 5,528,490 | 6/1996 | Hill | 705/26 |
| 5,675,784 | 10/1997 | Maxwell et al. | 707/100 |
| 5,715,314 | 2/1998 | Payne et al. | 380/24 |
| 5,740,425 | 4/1998 | Povilus | 705/26 |
| 5,890,175 | 3/1999 | Wong et al. | 705/26 |
| 5,897,639 | 4/1999 | Greef et al. | 705/26 |
| 6,014,639 | 1/2000 | Fohn et al. | 705/27 |
| 6,016,504 | 1/2000 | Arnold et al. | 705/27 |

FOREIGN PATENT DOCUMENTS

| | | |
|---|---|---|
| 4-3250 | 1/1992 | Japan . |

OTHER PUBLICATIONS

Houts, Ean. "iCat enables online catalogs, 'stores': suite provides good tools for Internet, intrenet commerce." Inforworld, v. 18, No. 47, Nov., 18, 1996.

"Intermind's new Dynamic Publisher offers Internet and intranet web sites an industry first—'channel wizards'." Business Wire (Seattle), Feb. 18, 1997.

Beckman, Mel. "Energize your web site." Macworld, v. 13, No. 10, p. 104, Oct. 1996.

"Internet Business Opportunities with IBM Net. Commerce", pp. 1–37.

Information on "IBM Net. Commerce: Features and Requirements", www.internet.ibm.com, pp. 1–7.

*Primary Examiner*—Allen R. MacDonald
*Assistant Examiner*—Michele Stuckey Crecca
*Attorney, Agent, or Firm*—Beall Law Offices

[57] ABSTRACT

Product data information to be stored in a product database is defined by setting essential items necessary to define products with respect to their essential parts, and setting optional items necessary to define optional products deriving from standards product defined by their essential items. A product definition section produces product data information on standard products based on the set essential items, and produces product data information on optional products based on the set optional items. This product data information is transferred from an electronic shop client to an electronic mall server to be stored into the product database through a product registering section.

34 Claims, 11 Drawing Sheets

| SHOP ID | PRODUCT NO. | PRODUCT SHOWCASE NAME | PRODUCT NAME | MAKER NAME | PRICE | CLASS-IFICATION | IMAGE FILE | EXPLANATION | ... |
|---|---|---|---|---|---|---|---|---|---|
| | 71 | 72 | 73 | 74 | 75 | 76 | 77 | 78 | |
| H-SHOES | 001 | MEN'S SHOES | LOAFER | X-SHOES | $98.00 | SHOES | | | |
| H-SHOES | 001-BL-1 | 001[BL][SIZE] | LOAFER[BLACK][25cm] | X-SHOES | $98.00 | SHOES | | | |
| ... | ... | ... | | | | ... | | ... | |
| H-SHOES | 001-BL-7 | 001[BL][SIZE] | LOAFER[BLACK][28cm] | X-SHOES | $98.00 | SHOES | | | |
| H-SHOES | 001-BR-1 | 001[BR][SIZE] | LOAFER[BROWN][25cm] | X-SHOES | $98.00 | SHOES | | | |
| ... | ... | ... | | | | ... | | ... | |
| H-SHOES | 001-BR-7 | 001[BR][SIZE] | LOAFER[BROWN][28cm] | X-SHOES | $98.00 | SHOES | | | |

*FIG. 7*

ELECTRONIC SHOPPING SYSTEM AND METHOD OF DEFINING ELECTRONIC CATALOGUE DATA THEREFOR

BACKGROUND OF THE INVENTION

1. Field of the Invention

The present invention relates generally to virtual shopping, and more particularly to an electronic shopping system and method for virtual shopping on a network using electronic catalogue data defined by the method.

2. Description of the Related Art

Recently, on-line shopping has become increasingly popular at virtual shops realized on a network, such as the Internet. Shoppers can use product catalogues that electronically provide product information on the network (hereinafter referred to as electronic catalogues), including product numbers, which allows the unique designation of each product. Product ordering is managed based on these product numbers.

In one system, electronic catalogue data that is less subject to change, such as a format or an outline of the electronic catalogue, is stored in a web server constituting the electronic catalogue, and data requested or required by a browser that is frequently subject to chance, such as information on products that consumers want to see in the electronic catalogue, is held in a database in a server. The electronic catalogue in this system is dynamically produced, and is displayed with the less-frequently altered information stored in a web server, combined with frequently altered data directly taken in from a database as requested by a browser.

In the system described above, product information for the electronic catalogue is manually registered in a database. In an electronic shopping system, products to be handled are given unique product numbers. Therefore, minor changes that are quite frequently made in products (such as, for example, changes to diversify products in color) continually increase the number of available products, which increases the difficulty of managing the products.

An electronic catalogue of items, such as travel packages and shoes, which have a great variety, contain pricing and descriptive data that is often common for many of the items. However, there does not exist an electronic catalogue system utilizing this duplication of data that is particular to an electronic catalogue. Therefore, an employee must manually register and maintain the current electronic catalogue of products with many varieties, which requires a fairly high degree of labor.

Furthermore, even a conventional mail order service involving a great deal of manual work sometimes suffers from human mistakes, leading to, for example, a situation where a product ordered is different from the product delivered. Current electronic shopping systems have not been immune to such problems.

SUMMARY OF THE INVENTION

Therefore, an object of the present invention is to provide a method for easily preparing an electronic catalogue that lists many variations of products, for an electronic shopping system realized on a network.

Another object of the present invention is to provide an electronic shopping system that prevents the delivery of a product that is different from one ordered and one referred to at the time of a settlement.

In order to achieve these and other objects, an electronic shopping system and a method of defining electronic catalogue data accept, in an electronic shop client, an input of essential item setting information (product definition information) for defining products with respect to their essential parts. Optional-item information, which is necessary for defining optional products derived from standard products defined by the essential item information, is also input. Further, product data information on the standard products is generated from the essential item information, and product data information on the optional products is generated from the standard product data information based on the optional-item information.

Preferably, the standard product data information and the optional product data information are transferred from the electronic shop client to an electronic mall server, where they are stored in a product database.

In one mode, the present invention includes product identifiers (IDs) to distinguish one product from another, product names of the products, selling prices of the products, and product management information used to manage the products. In addition, optional-item information includes information designating the modes of sales of the products or the modes of the products.

The electronic mall server according to the present invention has a storage for storing electronic shop information, including a shop database defined by an electronic shop client for holding information on virtual shops realized on the network, a product database for holding product data information on products to be sold by the virtual shops and a basket database for holding information regarding products indicated for purchase by the purchaser client, and control means for controlling operations of the electronic mall server.

The control means receives display request information sent from the purchaser client and analyzes the request from the purchaser client based on the display request information. When the purchaser client requests an electronic catalogue, the control means generates and transfers display information to display the electronic catalogue to the purchaser client based on the shop database information and the product data information. When the request from the purchaser client designates a product for purchase, the control means extracts product data information on the product from the product database, and registers the extracted product data information in the basket database allocated to the purchaser client. Further, when the request from the purchaser client designates the purchase of a product, the control means reads out the product data information held in the basket database as a product designated for purchase and executes a settlement based on the read-out product data information.

BRIEF DESCRIPTION OF THE DRAWINGS

FIG. 7 is a logical diagram of product data information to be stored in a product database.

DETAILED DESCRIPTION OF THE PREFERRED EMBODIMENTS

Figure 1:
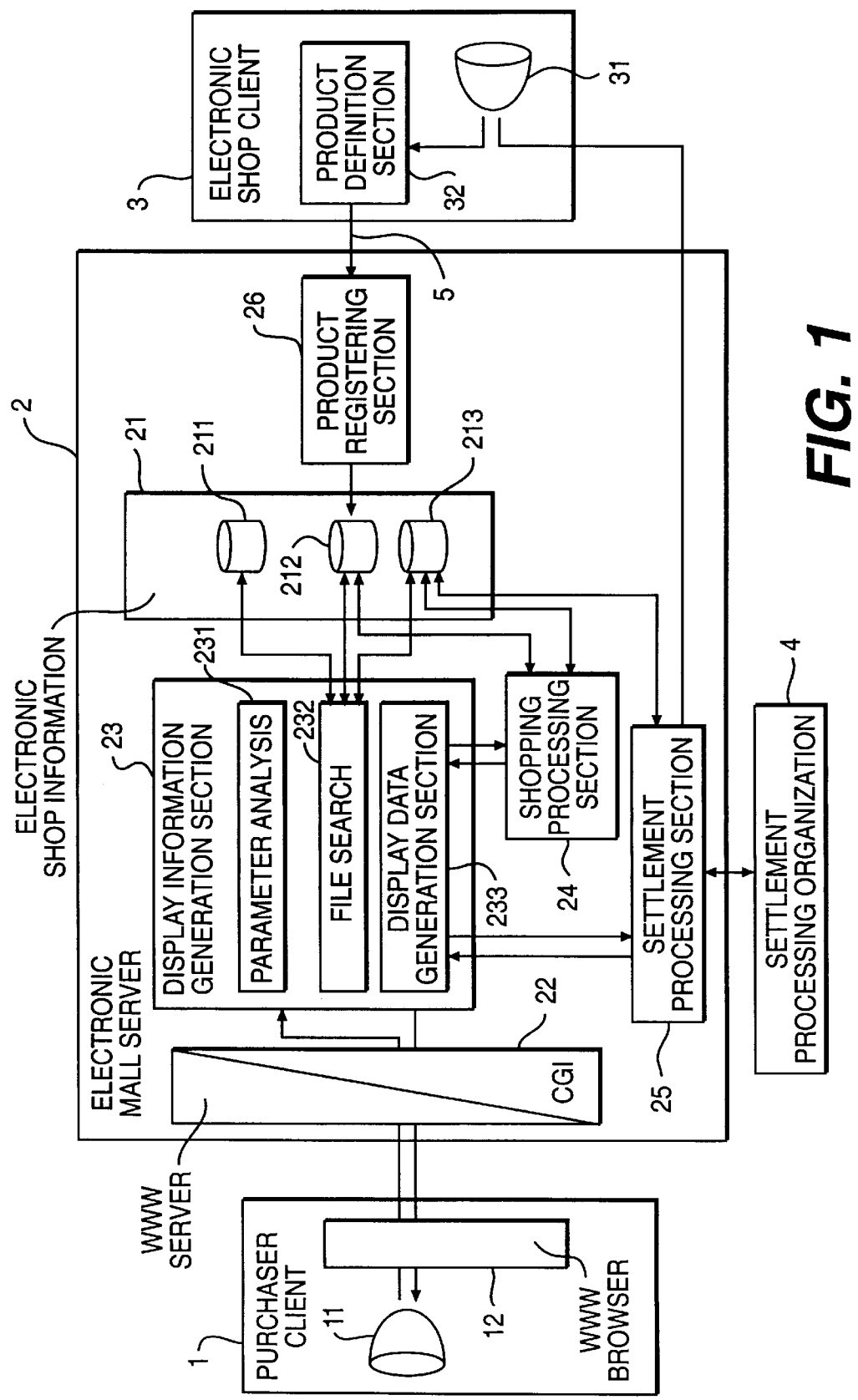
FIG. 1 shows an electronic shopping system embodying the present invention.

FIG. 1 is a drawing showing the configuration of an electronic shopping system according to an embodiment of the present invention. As shown in FIG. 1, the electronic shopping system comprises a purchaser client 1, an electronic mall server 2, an electronic shop client 3, and a settlement organization 4 (e.g., a credit provider), which are physically interconnected with each other through a network. The present embodiment will be described on the assumption that the network connecting the purchaser client 1, the electronic mall server 2, the electronic shop client 3, and the settlement organization 4 is the Internet.

The purchaser client 1 is a terminal (for example, a personal computer) used by a purchaser to shop electronically. The purchaser client 1 has an input/output device 11 interfacing with its user (the consumer, or purchaser) and comprises, for example, an input device such as a keyboard or a mouse and an output device such as a CRT display. The purchaser client 1 may have a World Wide Web (WWW) browser 12 serving as an interface with the electronic mall server 2, although any suitable interface is contemplated within the scope of the invention. When the purchaser client 1 is a personal computer, the WWW browser 12 is typically a software program stored in its memory.

The electronic shop client 3 defines product data to be handled by the electronic shop client by using a product definition section 32 through an input/output device 31. Data defined here is transferred to the electronic mall server 2 as product data information 5 and stored in a product database 212. In this embodiment, the product data information 5 includes text data such as the names of showcases displaying products, product numbers, product names, product prices, and product explanations, as well as product image data.

The input/output device 31 interfaces with the producer of the electronic catalogue, the user who supplies products in the electronic shopping system. The input/output device 31 accepts product information necessary to define the products from text data inputted from the producer, including text data such as the names of product showcases, product names, and prices, as well as image data showing the products themselves, for example. The input/output device 31 outputs information for a product purchased by a purchaser, such as a product number and an order volume, delivery information such as an address, and settlement information such as the name of a settlement organization and the date and amount of a settlement. The electronic shop client 3 may be an information-processing apparatus such as a personal computer, and the input/output device 31 may be a keyboard, a mouse and a CRT display. In this case, the product definition section 32 is preferably realized by a software program stored in a memory of the information-processing apparatus.

The electronic mall server 2 holds electronic shop information 21, including a shop database 211, the product database 212, and a basket database 213. The shop database 211 stores information used for opening an electronic shop and information defining a shop layout for the display of product information. The product database 212 stores product data information defined by the electronic shop client 3. The basket database 213 stores information on a product designated for purchase by the purchaser client 1.

A product registering section 26 serves to store the product data information 5 transferred from the electronic shop client 3 into the product database 212. A WWW server/CGI (Common Gateway Interface) 22 serves as an interface with a purchaser client 1, receives display request information from the purchaser client 1, and transfers display data to the purchaser client 1.

A display information generation section 23 generates display information, such as an electronic catalogue, in response to a request from the purchaser client 1. The display information generation section 23 includes a parameter analysis section 231, a file search section 232, and a display data generation section 233. The parameter analysis section 231 analyzes display request page information received from the purchaser client 1 through the WWW server/CGI 22 and extracts parameters contained in the display request page information. The file search section 232, based on parameters extracted by the parameter analysis section 231, searches through the databases in the electronic shop information 21. The display data generation section 233, based on data picked up through a search by the file search section 232, generates display data to be displayed as a WWW page. In other words, the display data generation section 233 serves as a WWW page generator.

A shopping processing section 24 receives a client ID from the display information generation section 23 and the product ID of a product when the product is designated for purchase by the purchaser client 1. Based on the received information, the shopping processing section 24 acuities from the product database 212 detailed information on the designated product and stores the acquired information in a client basket database for a specific client within the basket database 213. Then, it acquires a list of products the specific client intends to purchase from the basket database 213 and transfers the acquired data to the display information generation section 23.

A settlement processing section 25 receives the client ID from the display generation section 23 and reads out product data information relating to the purchaser from the basket database 213 when the purchaser decides on a purchase. Based on the read-out product data information, the settlement processing section 25 requests the settlement organization 4 to execute a settlement. The settlement processing section 25 then receives notification of the completion of the settlement from the settlement organization 4 and notifies the electronic shop client 3 of the completion of the ordering process. In order to confirm the purchase to the purchaser client 1, the settlement processing section 25 also prepares detailed data as a base and transfers the prepared data to the display information generation section 23.

The electronic mall server 2 can be constituted by an information processing apparatus such as a personal computer or a workstation. Electronic shop information 21 is stored in a storage device available from this information processing device, such as a magnetic disk device or an optical disk device. All of the above-described processing sections (namely, the WWW server/CGI 22, the display information generation section 23, the shopping processing section 24, the settlement processing section 25, and the product registering section 26) are preferably executed by a software program stored in a memory of the information-processing apparatus.

Based on a request received from the settlement processing section 25 of the electronic mall server 2, the settlement organization 4 executes a settlement-processing job on behalf of the electronic shop client 3.

Figure 2:
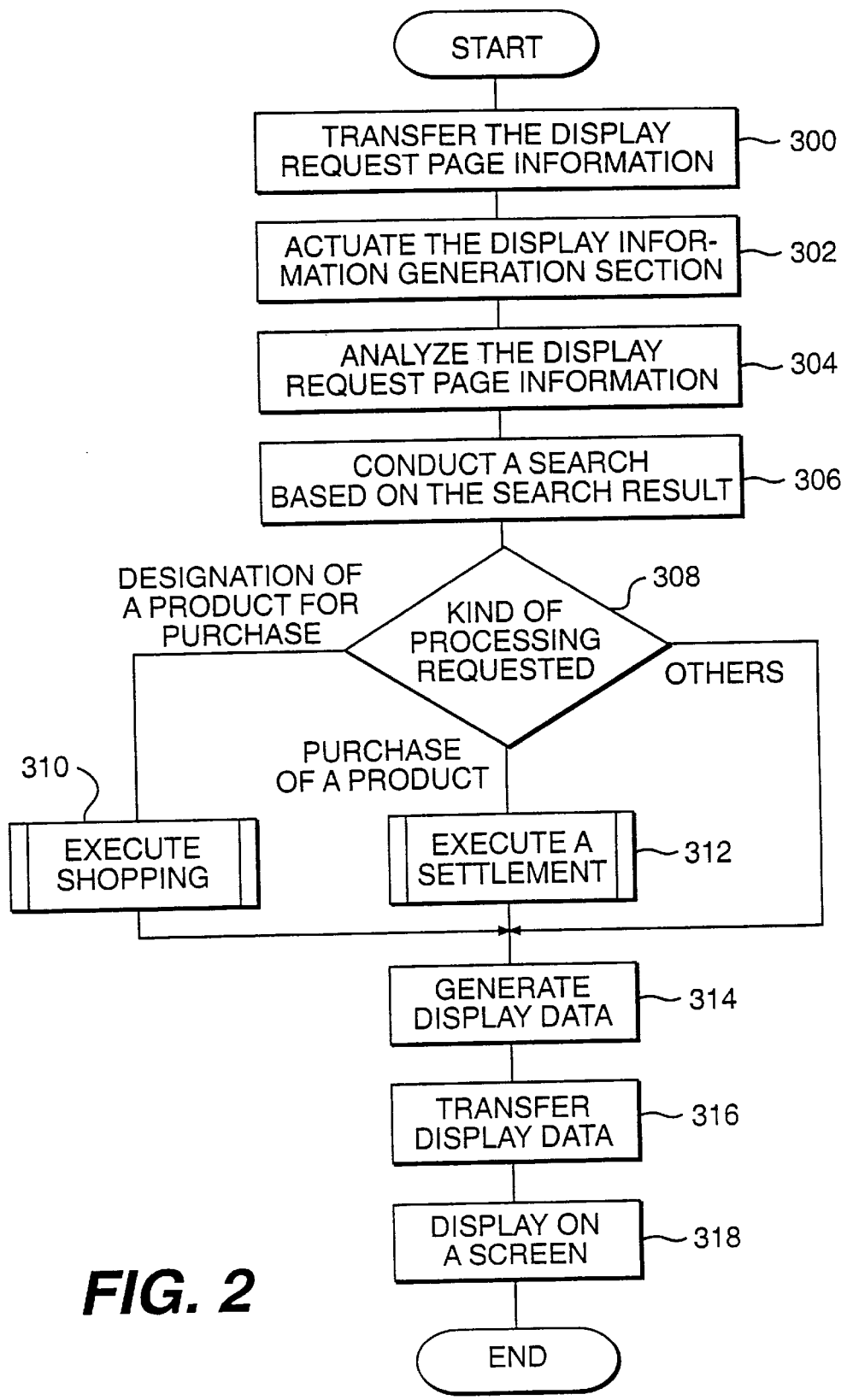
FIG. 2 is a flowchart describing a shopping experience in the electronic shopping system.

FIG. 2 outlines a flow of processing steps when electronic shopping is conducted through the electronic shopping system.

A user or a purchaser wishing to shop electronically first inputs a URL (uniform resource locator) designating an address for a home page on the WWW at which electronic shop information is kept, as a request screen page. The purchaser client 1 receives the input of this URL and transfers display request page information, including the input URL, to the electronic mall server 2 through the WWW browser 12. When the luser selects or decides to purchase a product, information, including the client ID, is also transferred as display request page information. As this process is not particularly different from the one used in the conventional electronic shopping system, its detailed description will be omitted here (Step 300).

At the electronic mall server 2, the WWW server/CGI 22 receives the display request page information and actuates the display information generation section 23 (Step 302).

When actuated, the display information generation section 23 receives the display request page information from the WWW server/CGI, and the parameter analysis section 231 analyzes the received display request page information (Step 304). As a result of its analysis, the parameter analysis section 231 outputs information (such as a shop ID) specifying an electronic shop to be displayed, a catalogue template specifying the background screen of the electronic catalogue, a product ID of a product to be displayed, and a client ID specifying the purchaser. Based on this information output from the parameter analysis section 23, the file search section 232 searches through the shop database 211, the product database 212, and the basket database 213 within the electronic shop information 21, and finds data necessary to produce a display screen for the home page requested by the purchaser client 1 (Step 306).

When the file search section 232 acquires data from the electronic shop information 21, the process shifts to the display data generation section 233. The display data generation section 233 judges the kind of request from the purchaser client 1 (Step 308). If the request from the purchaser client 1 is other than the "designation of a product for its intended purchase" and the "purchase of a product," the file search section 232, using the display data generation section 233 based on the result of the search, generates data for display (Step 314).

Figure 3:
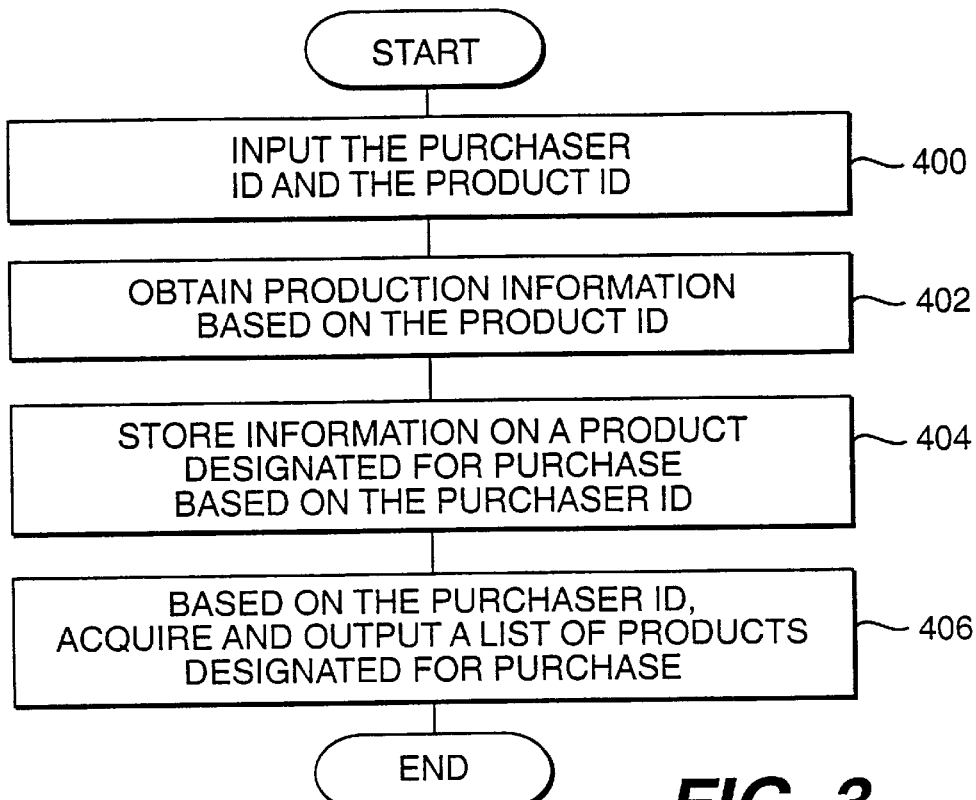
FIG. 3 is a flowchart for a shopping processing section.

When the request from the purchaser client is judged in Step 308 to be "designation of a product for its intended purchase," namely when the purchaser instructs to "put selected products in a shopping bag" to designate displayed products for their intended purchase in Step 300, the display data generation section 233 actuates the shopping processing section 24 prior to the generation of display data in Step 314. The flow of processing steps executed at the shopping processing section is shown in FIG. 3.

When actuated, the shopping processing section 24 receives the client ID and the product ID of a product designated for purchase from the display data generation section 233 (Step 400). With this product ID as key information, the shopping processing section 24 acquires detailed product information on the product from the product database 212 (Step 402). The detailed product information acquired in Step 402 is stored into a client basket database for the client identified by the client ID received from the display data generation section 233 in the basket database 213. When no client basket database is available, a client basket database is prepared in correspondence with the client ID to store the product data information therein (Step 404). Then, the product data information on all products selected by the client from the client basket database is taken out and transferred to the display data generation section 233 (Step 406).

In this case, the display data generation section 233 generates display information listing products designated for purchase based on product information received from the shopping processing section 24 in Step 314, and sends the product list to the purchaser client 1. Based on the information transferred and displayed, the purchaser confirms the products and, if desired, can cancel part or all of the order.

Figure 4:
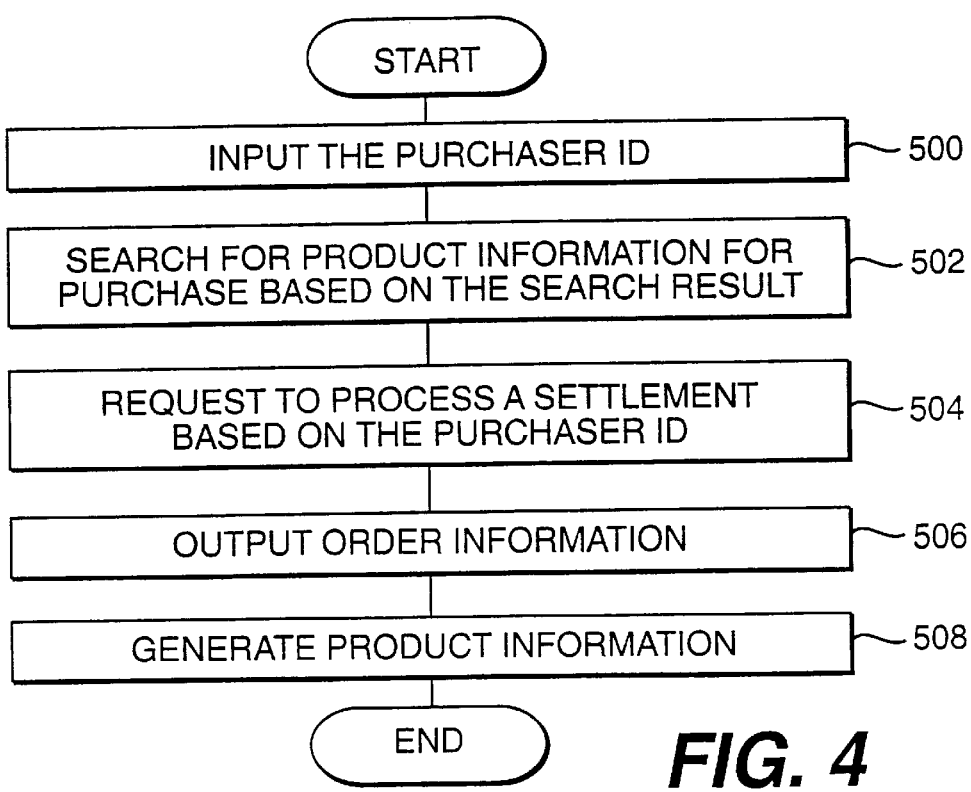
FIG. 4 is a flowchart for a settlement processing section.

When the kind of request from the purchaser client is judged in Step 308 to be the "purchase of a product" (that is, the purchaser designates the purchase of products selected in Step 300), the display data generation section 233 actuates the settlement processing section 25 prior to the generation of display data in Step 314 (Step 312). The flow of processing steps executed by the settlement processing section 25 is shown in FIG. 4.

When actuated, the settlement processing section 25 receives the client ID from the display data generation section 233 (Step 500). With the received client ID as key information, the settlement processing section 25 searches for product data information on purchased products held in the client basket database identified by the client ID in the basket database 213 (Step 502). Based on the product data information obtained through this search, the settlement processing section 25 requests the settlement organization 4 to execute a settlement (Step 504). In response to this request, the settlement organization 4 executes a settlement on behalf of the electronic shop client 3 and notifies the electronic mall server 2 that the settlement has been completed. As this settlement processing executed at the settlement organization 4 is not particularly different from its conventional counterpart, its detailed description will be omitted here.

When receiving notification of the completion of the settlement from the settlement organization 4, the settlement processing section 25 transfers order information on the product or products purchased by the purchaser, including product information such as the product number and order volume, delivery information such as the delivery address, and settlement information such as the name of the settlement organization 4 and the date and amount of the settlement, to the electronic shop client 3. At the electronic shop client 3, the input and output device 31 displays order information received from the electronic mall server 2 (Step 506). Finally, the settlement processing section 25 prepares detailed data concerning the completion of the settlement, which it transfers to the display data generation section 233 (Step 508). The display data generation section 233 generates a display screen indicating the completion of the settlement based on the received detailed data, and transfers it to the purchaser client 1.

Figure 5:
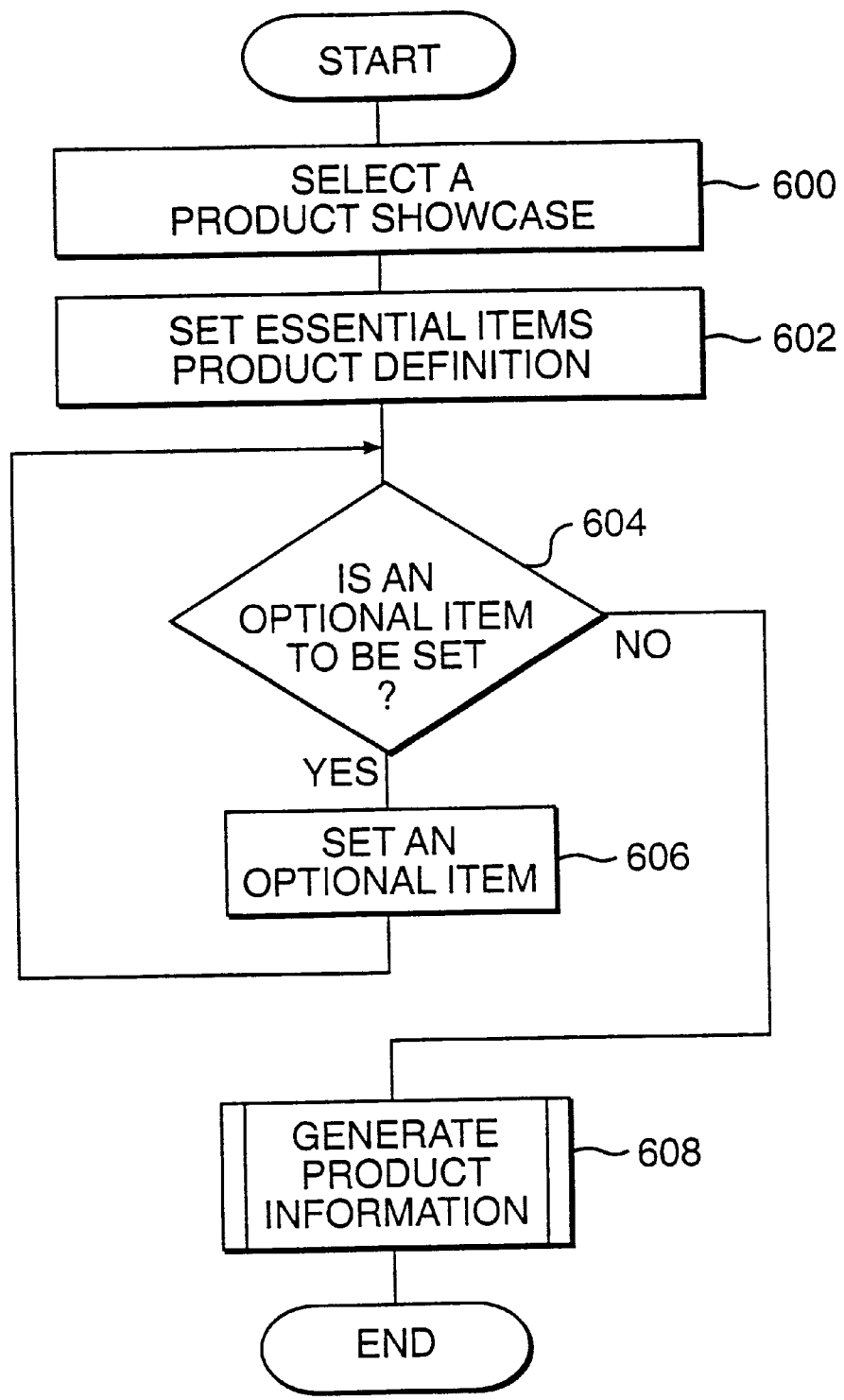
FIG. 5 is a flowchart for product data information generation processing in a product definition section.

Next, the definition of product data executed by the product definition section 32 at the electronic shop client 3, which constitutes a characteristic part of this embodiment of the present invention, will be explained. The flow of product data definition processing executed by the product definition section 32 is shown in FIG. 5.

First, a showcase exhibiting products needs to be given a name. In this step, the product definition section 32 displays information on the input/output device 31 on the existing product showcases maintained there in the form of, for example, a list. The producer of an electronic catalogue operating the electronic shop client 3 selects a desired product showcase name if it exists among the displayed product showcase names. When a desired product showcase name does not exist, a new product showcase name can be created using the input/output device 31 (Step 600). A product showcase name is information that the producer of an electronic catalogue can use to manage products in the same manner as products are managed on each shelf at an ordinary shop. Generated product data information is stored and managed in association with product showcase names in the product database 212.

The selection of a product showcase name is followed by the definition of product data. As the first step, essential product definition items that are associated with each example of the product of concern are input from the input/output device 31 (Step 602). These product definition items relate to certain necessities of offering products for sale in an electronic catalogue, such as production numbers allocated to specify products, the product names, prices and explanations of products, production management information, and image data which are not variable irrespective of the types and kinds of products to be defined. In other words, products that are the same in type and kind (such as color, size and mode of sale) but available in variation, have particulars which are essential and which can be defined in common, irrespective of their differences. These essential items are product definition items, and products defined by these essential items are referred to as standard products.

Following an input of information on the product definition items, the product definition section 32 judges whether the producer of the electronic catalogue has executed an input to designate optional items (Step 604). "Optional items" are items that do not relate to essential items, but relate instead to selective or additional information indicating the characters of products defined in Step 602. For example, the size or color of a dress or shoes, the mode of a travel product such as the departure date, departure place and the number of days covered by a travel package, or the mode of sales such as a single product or a set of products, are optional items. Optional items are used to specify a product that is available in variety.

When the producer of an electronic catalogue designates optional items, a screen is brought up on the input/output device 31 in accordance with the type of optional items designated, to allow the electronic catalogue producer to input optional-item information (Step 606). For example, the following product information may be set:

(A) the number of items available in a set, if the product is sold at a set price;

(B) "Step Level" is selected, if the product is available in a range of sizes (e.g., "Large, Medium, Small"), to select the range of available sizes; and "Range, Step Designation" is selected if shoes (for example) are available in a step value (e.g., in 0.5 cm increments from 25 cm to 28 cm, or in conventional American sizes) to designate the uppermost value, the lowermost value, a step (or increment), and a measuring unit;

(C) the number of available colors and a description of the colors, if the product is available in various colors;

(D) travel information, including places available for departure, the styles of accommodations, and the number of stays, if the product is a travel package offered by a travel agent, for example.

When a product to be defined has a plurality of optional items, the processing in Steps 604 and 606 is repeated. Products defined by optional items and essential product definition items set here will be referred to as optional products.

When optional-item setting is completed (or not executed at all from the start), the product definition section 32 generates product data information to be registered in the product database 212 based on product information defined as described above. The generated product data information is transferred to the electronic mall server 2 (Step 608). Details of the processing to generate product data information are shown in a flowchart in FIG. 6.

Figure 6:
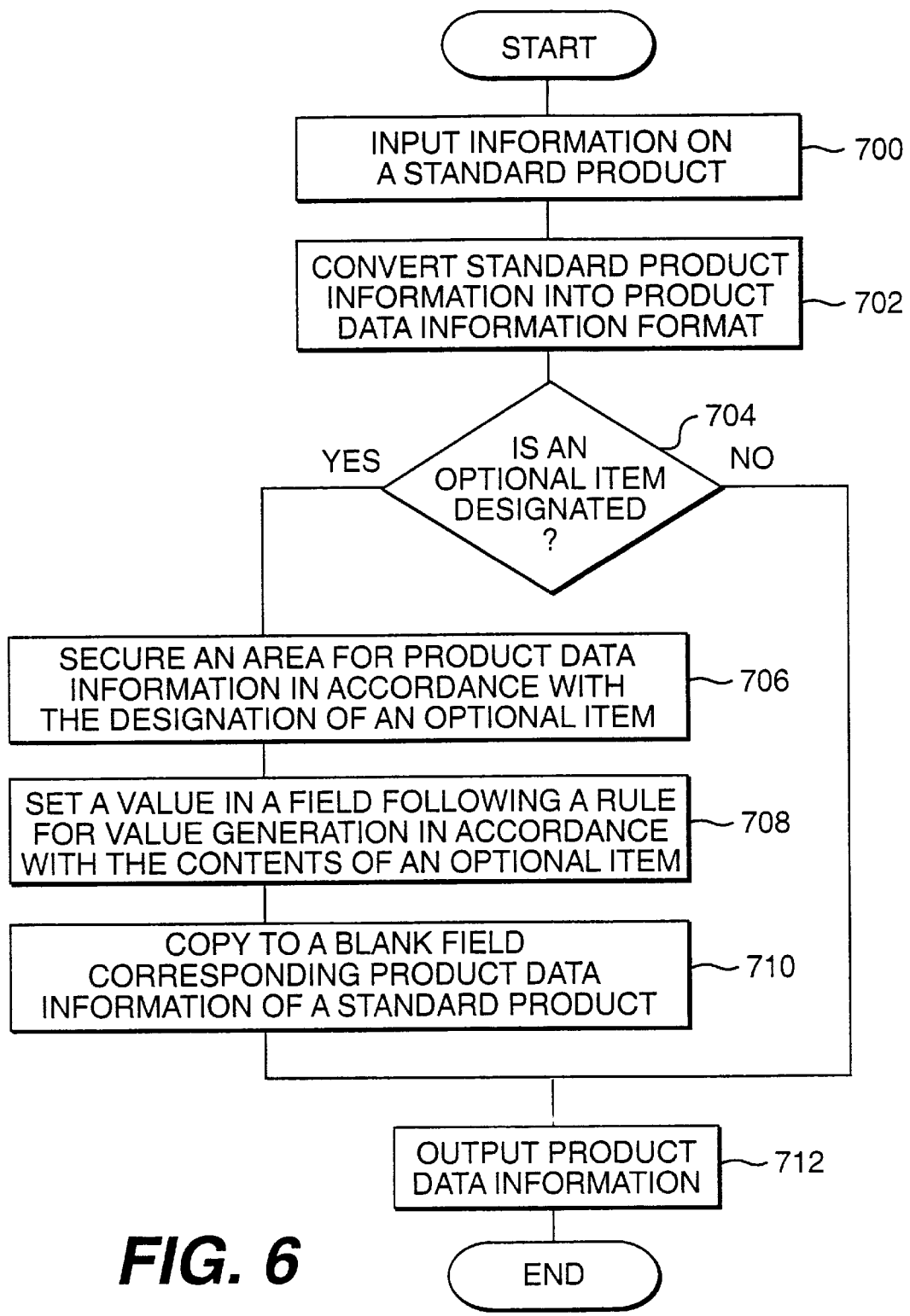
FIG. 6 is a detailed flowchart showing the product data information generation processing.

In the processing to generate product data information, information is first obtained for a standard product defined in Steps 606 and 602 as shown in FIG. 6 (Step 700). The obtained standard product information is converted into a format to be stored in the product database 212 (step 702). Product data information will be explained later in detail.

Next, whether optional items are set with respect to a standard product defined in the product-defining steps 604 and 606 is determined (Step 704). When it is judged in Step 704 that no optional items are set, the product data information generated in Step 702 is output as product data information to be transferred to the mall server 2 (Step 712).

When it is judged in Step 704 that an optional item has been set, an area to register information relating to the optional products is secured in the product data information generated in Step 702 according to the contents set for optional items specified in Step 606. When a plurality of optional items are set, an area is secured corresponding to the number of each optional item multiplied by the numbers of the other optional items. For example, when two colors and seven sizes are set as optional items with respect to a pair of shoes, an area needs to be secured for a total of 14 products (i.e., 2 colors×7 sizes, the number of the first options multiplied by the number of the second options) (Step 706).

If a rule is set beforehand to set a value for optional items in a field within the area of product data information secured in Step 706, data to be set within that field is generated according to the rule and set in the relevant field of product data information (Step 708). As a rule, for example, "Product Number of Standard Product+Item Name of Optional Item A" may be set for a product showcase name, "Product Number of Standard Product+Serial Number in Standard Product" for a product number, and "Product Name of Standard Product+Set Values of Optional Item A" for a product name.

Next, product data information for a standard product can be copied to a blank field, for which no value was set in Step 708, or for which there is no rule to set a value therefor (Step 710) in order to generate and output its product data information (Step 712).

As shown in FIG. 7, product data information generated through the processing described above includes, for example, a shop ID column 70, a product number column 71, a product showcase name column 72, a product name column 73, a maker name column 74, a price column 75, a classification column 76, an image file column 77, an explanation column 78, etc. The columns are optionally provided, and may be selected for autoentry of information or manual entry. In FIG. 7, a record 720 is a section where product data information is set with respect to a standard product in Step 702. Records subsequent to a record 730 include an area secured in Step 706 for product data information, for which values are set in Step 708 with respect to optional products.

Figure 8:
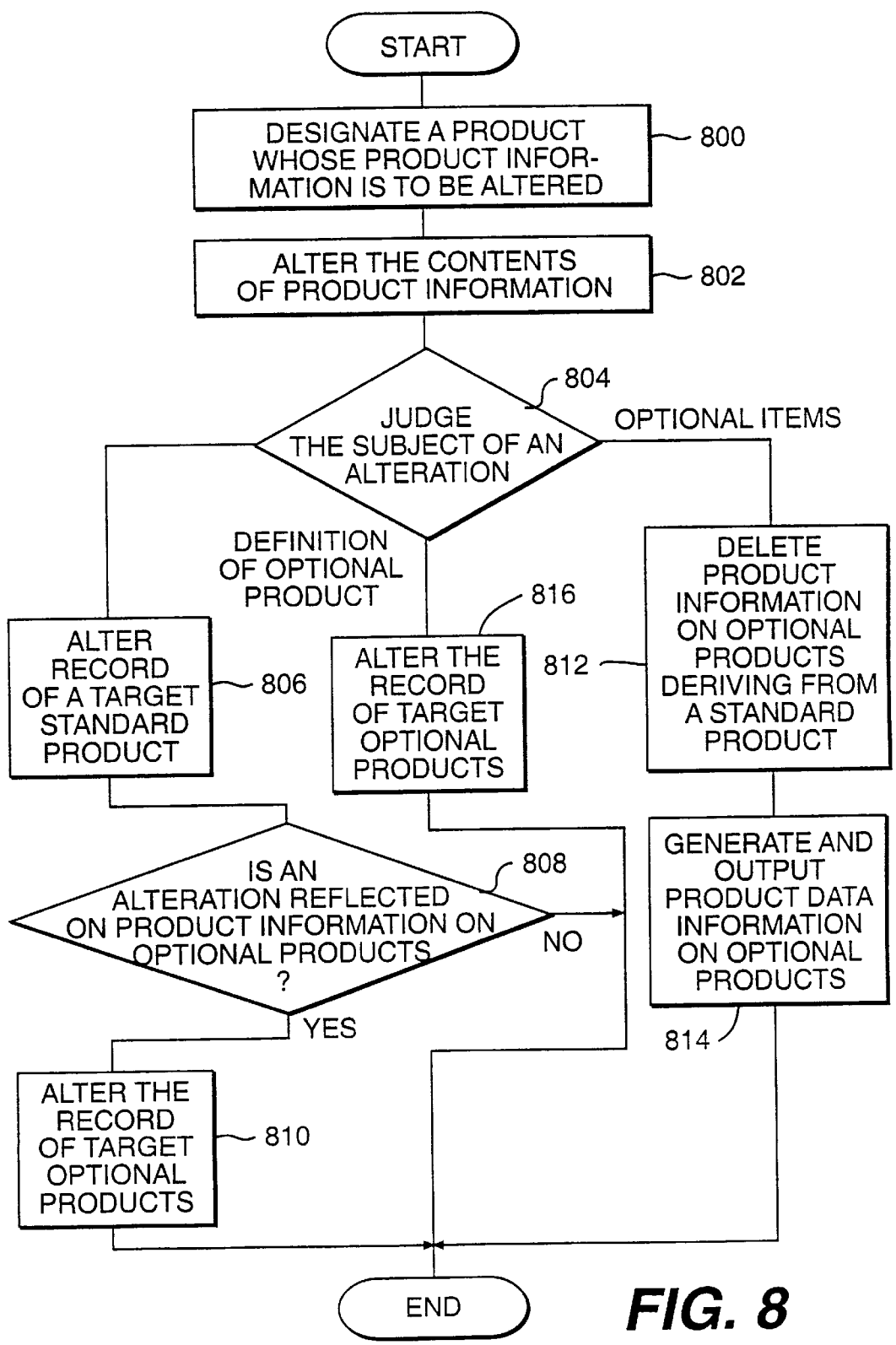
FIG. 8 is a flowchart showing a flow of steps to alter product definition information registered in the product database.

FIG. 8 is a flowchart showing steps for altering the existing product data information in the electronic shop client 3 (namely, product data information on products already registered in the product database 212 in the electronic mall server 2). The process to alter product data information will be explained next with reference to this drawing.

The electronic shopping system first accepts the designation of a product showcase exhibiting products that are subject to an alteration by the electronic catalogue producer. Then, a list of products registered in the designated product showcase is displayed on the input/output device 31, to allow the product information of a product selected from the listed products to be changed (Step 800).

The product data information defined with respect to a product selected in Step 800 is displayed on the input/output device 31 to accept an alteration to the defined information (Step 802).

Next, the electronic catalogue producer determines whether the alteration is to the defined information of a standard product (essential items), optional items used to generate product data information on optional products, or the defined information for each optional item (Step 804).

When an alteration is made to the defined information on a standard product, the contents of a record (Record 720 in FIG. 7) for the standard product in the corresponding product data information in the product database 212 are altered according to the input alteration (Step 806). Then, a screen is displayed on the input/output device 31, asking whether the contents of the alteration need to be reflected on the defined information on optional products. The process then waits for an instruction from the electronic catalogue producer (Step 808).

When an instruction is given to reflect the alteration in Step 808, records defining product information on optional products (records after records 720 in FIG. 7) are altered in a field corresponding to the altered product information for the standard product, based on the product data information within the product database 212 (Step 810). When an instruction is not given to reflect the alteration in Step 808, the processing is brought to an end.

When an alteration is made with respect to optional items used to generate product data information on optional products in Step 804, defined information on the optional products deriving from the standard product are deleted from the product database 212 (Step 812). Then, product data information defining product information with respect to new optional products is generated based on the contents of an alteration for the optional items, through the same processing set forth above with respect to Step 706 through Step 710 in FIG. 6. The generated product data information is then transferred to the electronic mall server 2 to be registered in the product database 212 (Step 814).

When it is judged that an alteration has been made to the defined information on an individual optional product in Step 804, a corresponding record for the product data information in the product database 212 is altered based on the contents of the alteration, and the processing is brought to an end (Step 816).

Through the above-described process, product data information registered in the product database 212 in the electronic mall server 2 can be altered. An alteration to the product database 212 is made with the electronic shop client 3 working with the electronic mall server 2. However, an alteration can also be made by transferring the product data information to be altered to the electronic shop client 3, making the alteration on the electronic shop client 3 through the same processing as described above, and then sending the altered product data information to the electronic mall server 2 to rewrite the contents of the product database 212.

Next, steps will be described in which the electronic catalogue producer in the above-described electronic shopping system defines product information anew with respect to a product ("shoes") that is available in different sizes ("25 cm–28 cm") and colors ("black", "brown"), and that is identified by a style name ("Loafer"). The products may be typically displayed in a showcase (named "Men's Shoes").

(1) For the showcase to display products to be defined, "Men's Shoes" is selected from a showcase name combo-box displayed on the screen of the input/output device 31. When the showcase name combo-box does not show the showcase name desired, a showcase with the name of "Men's Shoes" is defined and produced on a product showcase name definition screen .that is separately available.

Figure 9:
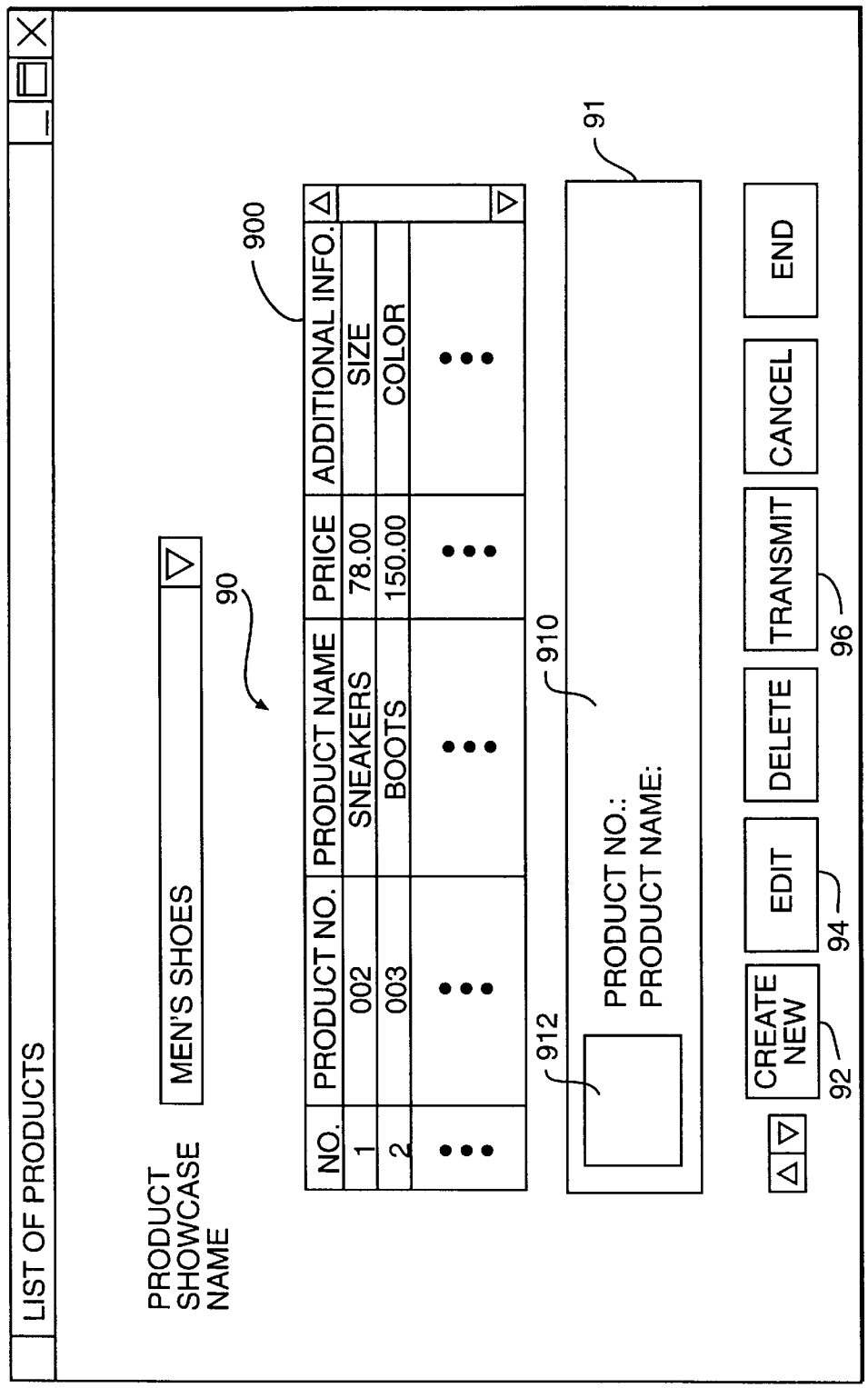
FIG. 9 is a diagram showing a screen layout of a list of products.
Figure 10:
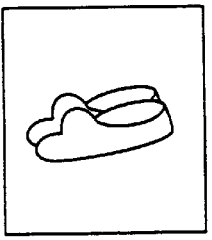
FIG. 10 is a diagram showing a screen layout of a product definition screen.

(2) When "Men's Shoes" is selected as a product showcase name, a product screen having a list of products (90) registered in the product showcase and handled at this shop is displayed on the input/output device 31 as shown in FIG. 9. To define a product "Loafer" anew in the product showcase "Men's Shoes," a "Create New" button 92 is selected. Then, a product definition screen is displayed on the input/output device 31 as shown in FIG. 10. FIG. 10 shows a state where data is input for all entries, but these entries are still left blank at this stage. To edit the existing product definition, a product whose definition is to be altered is selected from a list of products 90 and an "Edit" button 94 is pressed. In this case, a product definition screen having product information subject to editing is displayed. The product definition on the screen can be edited through operations described below.

(3) On the product definition screen, information is input, with respect to "Loafer" as a standard product, to define a product number, a product name, a maker name, a price, a classification, a product image, a detailed explanation, etc., in accordance with guidance appearing on the screen.

Figure 11:
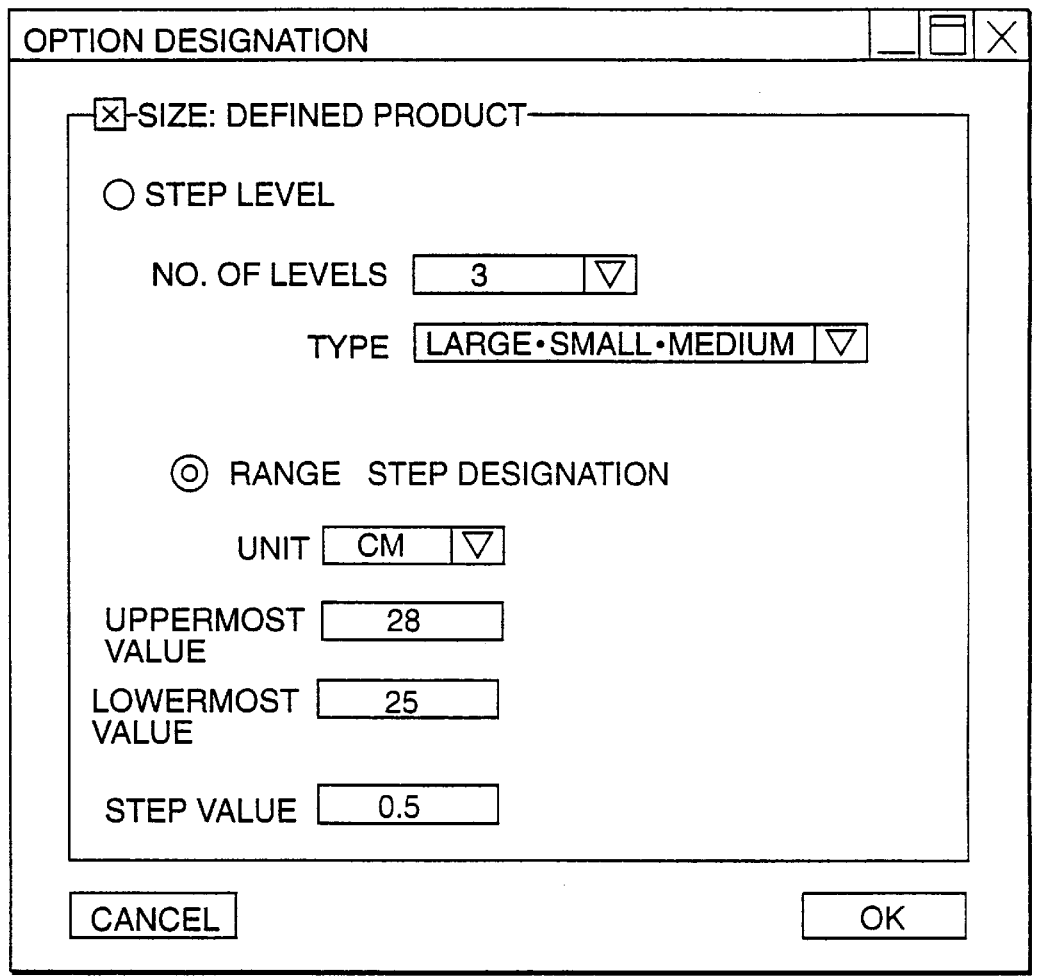
FIG. 11 is a diagram showing a screen layout of an option definition screen.
Figure 12:
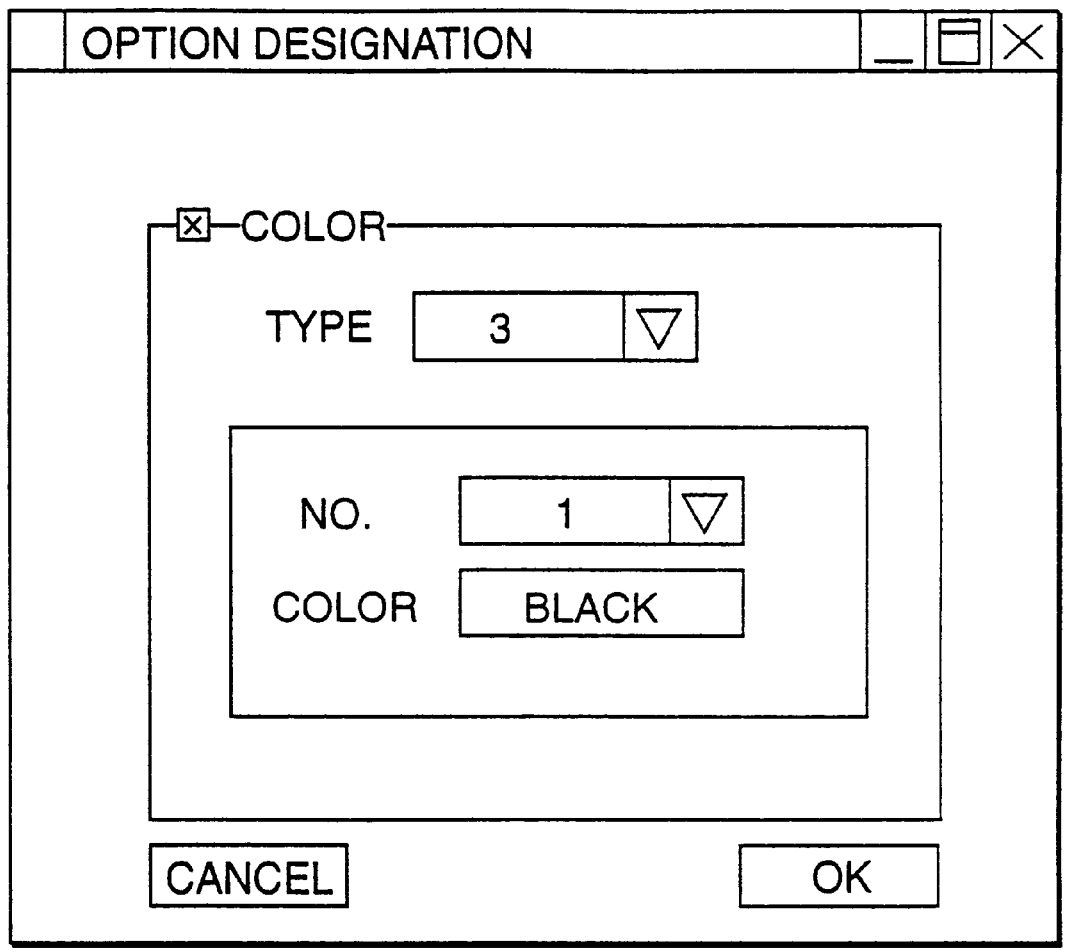
FIG. 12 is a diagram showing a screen layout of an option definition screen.

(4) In this case, where the product to be defined has selective elements such as the optional items "Size" and "Color", the items "Size" and "Color" are selected in an option designation box 1010 on the product definition screen to designate optional items. When "Size" is selected as an optional item, an option designation screen as shown in FIG. 11 comes up on the input/output device 31. When "Color" is selected as an optional item, an option designation screen as shown in FIG. 12 is displayed on the input/output device 31. The electronic catalogue producer sets a value matching the input screen displayed.

The option designation screen in FIG. 11 shows that a product being defined requires a "size to be selected", considering a step value of 0.5 cm, an uppermost value of 28 cm, and a lowermost value of 25 cm. The option designation screen in FIG. 12 shows that the product being defined requires a "color to be selected" from two options, with "BLACK" being selected in the illustration. When all optional items are set, an "OK" button 1020 is pressed on the product definition screen.

(5) Through the above-described operations, product data information is produced from the product definition section 32 on a single standard product and 14 optional products (7 sizes×2 colors=14), totaling 15 products.

After the completion of the above definition of products, the list of products 90 shows only information on the "Loafer" defined as a standard product among the defined products. An additional information column 900 indicates the presence of optional items such as "Size" and "Color."

When a product is selected from the list of products 90 on the product definition screen, a product number and product name registered with respect to the selected product are displayed in an area 910 within an indication screen 91, and product image information in an area 912 is displayed. After the complete definition of products is finished, a "Transmit" button 96 is pressed. Then, the product data information 5 outputted from the product definition section 32 is transmitted to the electronic mall server 2 to be stored into the product database 212 through the product registering section 26.

If a rule is set beforehand to allocate a showcase name with respect to optional products on which production information is automatically generated by setting of optional items, such as "Product Number of Standard Product", "Value for Optional Item of Option 1", "Value for Optional Item of Option 2", and "Set Optional Item of Option 1 for 'Color' and Set Optional Item of Option 2 for 'Size'", black "Loafer" shoes are stored in a product showcase with a name "001[BL][SIZE]", and brown "Loafer" shoes are stored in a product showcase with a name "001[BR][SIZE]." To display a list of optional products and edit product information on individual optional products, a product showcase storing a target optional product can be selected.

As described above, when a product having many variations, including products different in such product modes as size and color and sales modes such as a set price, needs to be defined to be displayed in an electronic catalogue, such product information as price and explanation common to all products is defined with respect to the standard product with the respective product modes and sales modes optionally defined according to the present invention, so that the volume of product information otherwise needing to be prepared by the operator of an electronic shop can be greatly reduced. Since a template to define a display format of a catalogue has its part for reference by a purchaser when specifying and placing an order for a product, allowing a description in the form of a table, the scalability can be secured for a product.

A case now will be explained wherein an electronic catalogue carrying products defined according to the above-described method of defining products in an electronic catalogue has part of its product data information duplicated. Since a standard product exists as a definition item in an output of a product definition method, duplicated product data information can be displayed with respect to only one product by utilizing this definition, and product information item differences from one optional product to another can be output in the form of a table.

Finally, a flow of a series of steps from the purchase of a product by a purchaser client to the processing of a settlement in the electronic mall server will be reviewed. In the electronic shopping system explained above with respect to one preferred embodiment of the present invention, information on a product selected from an electronic catalogue and designated for purchase from the purchase client is copied from the product database to the basket database. Product information to be referred to in the electronic mall server at the time of a settlement is output from the basket database 213 which is originally registered in the product database. Thus, information on a product designated by the purchaser client from an electronic catalogue, and information referred to in the electronic mall server at the time of a settlement, are the same. Therefore, human mistakes that make a product delivered different from a product ordered or from a product referred to at the time of a settlement can be reduced or avoided.

The present invention has been explained with respect its preferred embodiments dealing with products with great varieties, including their modes such as size and color and the modes of their sales. However, the present invention is in no way limited to or bound by the specific embodiments of the present invention described above. To deal with products offering benefits, for example, an item "Product with Special Benefit" can be produced with an input screen, and data processing added, such as "Size-Designated Product", "Color-Designated Product", "Set Sales-Designated Product" etc. Products that can be dealt with are not limited only to physical products such as shoes but extend to a "travel package" which commercializes a travel as a good.

Thus, as explained above, the present invention permits products that would otherwise require an extremely large amount of defining information to be defined by simply defining diversifying products with uniquely-allocated elements on a GUI screen.

Furthermore, the invention permits the product information to be entered or modified by a user who need have no knowledge of the data structure. Indeed, the user can easily enter or modify product information as described above, even if the user has no programming knowledge.

The invention also does not require a separate record specification of each item in its entirety, but instead permits a general specification of "essential" information (i.e., information common to all goods of a particular type, such as kind of product (shoes), price, etc.).

What is claimed is:

1. A computerized method of defining electronic catalogue data for an electronic catalogue that contains product data information to be provided through an electronic shopping mall system composed of a purchaser client, an electronic mall server, an electronic shop client, and a settlement organization, comprising:

a product-definition-item setting step for setting, in the electronic shop client, product definition information that identifies essential items for standard products;

an optional-item setting step for setting, at a single option designation screen page, optional-item information that identifies optional items that are available for said standard products, including steps of setting an uppermost value of an optional item, setting a lowermost value of said optional item, setting a step value establishing intermediate values of said optional item between said uppermost value and said lowermost value, and thereby automatically generating information of plural optional products as said optional-item information;

a step for generating product definition data concerning said standard products from said product definition information;

a step for generating optional-product data concerning said standard products that have at least one of said optional items, from said product definition data based on said optional-item information; and an organizing step for organizing said optional-product data into electronic catalogue entries for viewing of products for sale.

2. A method of defining electronic catalogue data as defined in claim 1, further comprising:

a step of editing said product definition information in the electronic shop client.

3. A method of defining electronic catalogue data as defined in claim 1, further comprising:

a step of editing said optional-item definition information in the electronic shop client.

4. A method of defining electronic catalogue data as defined in claim 1, further comprising:
   a step, performed by said electronic shop client, for transferring said product definition data and said optional-product data to said electronic mall server; and
   a step for storing said product definition data and said optional-product data into a product database through said electronic mall server.

5. A method of defining electronic catalogue data as defined in claim 4, wherein the product database is stored in said electronic mall server.

6. A method of defining electronic catalogue data as defined in claim 1,
   wherein said product definition information includes product identifiers that distinguish individual ones of said standard products, the product names of said standard products, the selling prices of said standard products, and product management information used to manage said standard products.

7. A method of defining electronic catalogue data as defined in claim 1,
   wherein said optional-item information includes information designating a mode of sale of said standard products.

8. A method of defining electronic catalogue data as defined in claim 1,
   wherein said optional-item information includes information designating modes of said standard products.

9. An electronic shop client for an electronic shopping system in which a purchaser client views products offered for sale by the electronic shop client through an electronic mall server via a network connecting the purchaser client, the electronic shop client, and the electronic mall server, the electronic shop client comprising:
   a product-defining section, including means for receiving product definition information that identifies essential items for standard products; means for receiving optional-item information that identifies optional items that are available for said standard products, said means for receiving optional item information including a single option designation screen page at which are set an uppermost value of an optional item, a lowermost value of said optional item, and a step value establishing intermediate values of said optional item between said uppermost value and said lowermost value, from which information of plural optional products is automatically generated as said optional item information;
   means for generating product definition data concerning said products from said product definition information, and optional-product data concerning said standard products that have at least one of said optional items, from said product definition data based on said optional-item information; and
   means for organizing said optional-product data into electronic catalogue entries for viewing of products for sale.

10. An electronic shop client as defined in claim 9, further comprising:
   means for editing said product definition information in the electronic shop client.

11. An electronic shop client as defined in claim 9, further comprising:
   means for editing said optional-item definition information in the electronic shop client.

12. An electronic shop client as defined in claim 9, wherein said product defining section includes means for transferring said product definition data and said optional-product data to said electronic mall server for storage into a product database in said electronic mall server.

13. An electronic mall server connected with a purchaser client and an electronic shop client through a network, to handle a transaction of a product between a purchaser using said purchaser client and a product supplier using an electronic catalogue maintained by said electronic shop client, comprising:
   storage means for storing electronic shop information, including a shop database defined by said electronic shop client, said shop database holding information on shops virtually realized on said network; a product database holding product information on products to be sold by said virtual shops; and a basket database allocated to said purchaser client and holding information on products indicated for purchase by said purchaser using said purchaser client; and
   control means for controlling operations of said electronic mall server, said control means receiving display request information sent from said purchaser client and analyzing a purchaser request contained in said display request information;
   wherein, when said purchaser request concerns a product in said electronic catalogue, said control means generates and transfers display information to display the electronic catalogue to said purchaser client based on said shop database and said product data information;
   wherein, when said request from said purchaser client designates a product for purchase, said control means extracts product data information concerning the product designated by said request from said product database, and registers the extracted product data information in said basket database allocated to said purchaser client; and
   wherein, when said request from said purchaser client designates a product for purchase, said control means reads out the product data information held in said basket database as a product designated for purchase, and initiates a settlement based on the read-out product data information.

14. An electronic mall server as defined in claim 13,
   wherein said control means requests a settlement organization connected to said network to complete the initiated settlement based on said product data information read out from said basket database, receives the completion of the settlement from said settlement organization, and transfers order information to said electronic shop client based on the settlement.

15. An electronic shopping system including a purchaser client, an electronic mall server, and an electronic shop client,
   wherein said electronic shop client includes a product-defining section, including means for receiving product definition information that identifies essential items for standard products; means for receiving optional-item information that identifies optional items that are available for said standard products, said means for receiving optional item information including a single option designation screen page at which are set an uppermost value of an optional item, a lowermost value of said optional item, and a step value establishing intermediate values of said optional item between said uppermost value and said lowermost value, from which information of plural optional products is automatically generated as said optional item information; means for generating product definition data concerning said standard products from said product definition information, and optional-product data concerning said standard products that have at least one of said optional items, from said product definition data based on said optional-item information; and means for organizing said optional-product data into electronic catalogue entries for viewing of products for sale, wherein said product defining section includes means for transferring said product definition data and said optional-product data to said electronic mall server;

wherein said electronic mall server has a product database and a product registering section for storing said product definition data and said optional-product data into said product database.

16. An electronic shopping system as defined in claim 15, wherein said electronic shop client further includes means for editing said product definition information in the electronic shop client.

17. An electronic shopping system as defined in claim 15, wherein said electronic shop client further includes means for editing said optional-item definition information in the electronic shop client.

18. An electronic shopping system as defined in claim 15, wherein:

said electronic mall server holds electronic shop information, including a shop database defined by said electronic shop client and holding information on shops virtually realized on a network, a product database holding product data information generated by said electronic shop client, and a basket database allocated to said purchaser client and holding information on products designated for purchase by said purchaser client;

wherein said electronic mall server includes a display information generation section for receiving display request information sent from said purchaser client, for analyzing request contained in the display request information, and for generating display information in response to the request based on said electronic shop information and the result of the analysis;

a shopping processing section for extracting, in response to the designation of a product for purchase by said purchaser client, product data information concerning a product designated by said request from said product database, and for registering the extracted product data information in said basket database allocated to said purchaser client; and a settlement processing section for reading out, in response to the designation of a product for purchase by said purchaser client, the product data information held in said basket database as a product designated for purchase, and initiating a settlement based on the read-out product data information.

19. A computer-readable storage medium encoded with executable instructions constituting a program for defining electronic catalogue data for an electronic catalogue generated and edited by an electronic shop computer, wherein the program, when executed by the electronic shop computer, causes the electronic shop computer to perform a method comprising the following steps:

a product-definition-item setting step for setting, in the electronic shop client, product definition information that identifies essential items for standard products;

an optional-item setting step for setting, at a single option designation screen page, optional-item information that identifies optional items that are available for said standard products, including steps of setting an uppermost value of an optional item, setting a lowermost value of said optional item, setting a step value establishing intermediate values of said optional item between said uppermost value and said lowermost value, and thereby automatically generating information of plural optional products as said optional-item information;

a step for generating product definition data concerning said standard products from said product definition information;

a step for generating optional-product data concerning said standard products that have at least one of said optional items, from said product definition data based on said optional-item information; and an organizing step for organizing said optional-product data into electronic catalogue entries for viewing of products for sale.

20. A computer-readable storage medium as defined in claim 19, wherein the program further causes the electronic shop computer to perform the following step:

a step of editing said product definition information in the electronic shop client.

21. A computer-readable storage medium as defined in claim 19, wherein the program further causes the electronic shop computer to perform the following step:

a step of editing said optional-item definition information in the electronic shop client.

22. A computer-readable storage medium as defined in claim 19, wherein the program further causes the electronic shop computer to perform the following steps:

a step for transferring said product definition data and said optional-product data to an electronic mall server over a network connecting the electronic shop client and the electronic mall server; and a step for storing said product definition data and said optional-product data into a product database through said electronic mall server.

23. A computer-readable storage medium as defined in claim 19, wherein said product definition information includes product identifiers that distinguish individual ones of said standard products, the product names of said standard products, the selling prices of said standard products, and product management information used to manage said standard products.

24. A computer-readable storage medium as defined in claim 19, wherein said optional-item information includes information designating a mode of sale of said standard products.

25. A computer-readable storage medium as defined in claim 19, wherein said optional-item information includes information designating modes of said standard products.

26. A computer program for defining electronic catalogue data for an electronic catalogue generated and edited by an electronic shop computer, said program being stored on a computer-readable storage medium encoded with executable instructions constituting the program, wherein the program, when executed by the electronic shop computer, causes the electronic shop computer to perform a method comprising the following steps:

a product-definition-item setting step for setting, in the electronic shop client, product definition information that identifies essential items for standard products;

an optional-item setting step for setting optional-item information that identifies optional items that are available for said standard products;

a step for generating product definition data concerning said standard products from said product definition information; and a step for generating optional-product data concerning said standard products that have at least one of said optional items, from said product definition data based on said optional-item information.

27. A computer program as defined in claim 26, wherein the program further causes the electronic shop computer to perform the following step:

a step of editing said product definition information in the electronic shop client.

28. A computer program as defined in claim 26, wherein the program further causes the electronic shop computer to perform the following step:

a step of editing said optional-item definition information in the electronic shop client.

29. A computer program as defined in claim 26, wherein the program further causes the electronic shop computer to perform the following steps:

a step for transferring said product definition data and said optional-product data to an electronic mall server over a network connecting the electronic shop client and the electronic mall server; and a step for storing said product definition data and said optional-product data into a product database through said electronic mall server.

30. A computer program as defined in claim 26, wherein said product definition information includes product identifiers that distinguish individual ones of said standard products, the product names of said standard products, the selling prices of said standard products, and product management information used to manage said standard products.

31. A computer program as defined in claim 26, wherein said optional-item information includes information designating a mode of sale of said standard products.

32. A computer program as defined in claim 26, wherein said optional-item information includes information designating modes of said standard products.

33. A computer method as defined in claim 1, further comprising a step for displaying the electronic catalogue entries, organized in said organizing step, in an electronic catalogue.

34. A computer program as defined in claim 26, wherein the program further comprises a step for displaying the electronic catalogue entries, organized in said organizing step, in an electronic catalogue.

* * * * *